United States Patent [19]

Garrett

[11] Patent Number: 4,963,272

[45] Date of Patent: Oct. 16, 1990

[54] APPARATUS AND METHOD FOR CONCENTRATING MATERIALS

[76] Inventor: Joseph B. Garrett, 198 Sagamore Rd., Millburn, N.J. 07041

[21] Appl. No.: 343,800

[22] Filed: Apr. 26, 1989

[51] Int. Cl.$^5$ .............................................. E02B 15/04
[52] U.S. Cl. ................................ 210/776; 210/242.3; 210/923
[58] Field of Search ...................... 210/242.3, 540, 776, 210/923, 96.1

[56] References Cited

U.S. PATENT DOCUMENTS

| | | | |
|---|---|---|---|
| 61,880 | 2/1867 | Serrell | 210/923 |
| 3,578,171 | 5/1971 | Usher | 210/776 |
| 3,662,892 | 5/1972 | Sorensen | 210/242.3 |
| 3,731,813 | 5/1973 | Tipton | 210/923 |
| 3,785,496 | 1/1974 | Smith | 210/242.3 |
| 3,794,175 | 2/1974 | Stewart | 210/923 |
| 3,853,768 | 12/1974 | Bagnulo | 210/923 |
| 3,933,654 | 1/1976 | Middelbeek . | |
| 3,957,646 | 5/1976 | Wickert | 210/923 |
| 3,966,615 | 6/1976 | Petchul et al. | 210/242.1 |
| 3,998,060 | 12/1976 | Preus | 210/923 |
| 4,000,618 | 1/1977 | Stovall . | |
| 4,011,164 | 3/1977 | McGivern . | |
| 4,046,691 | 9/1977 | Irons | 210/923 |
| 4,067,811 | 1/1978 | Dallamore . | |
| 4,116,007 | 9/1978 | Stagemeyer et al. . | |
| 4,146,482 | 3/1979 | Shyu | 210/923 |
| 4,237,012 | 12/1980 | Fayre | 210/923 |
| 4,257,889 | 3/1981 | Wöber et al. | 210/923 |
| 4,265,757 | 5/1981 | Ivanoff | 210/923 |
| 4,356,086 | 10/1982 | Öberg . | |
| 4,378,291 | 3/1983 | Ward et al. . | |
| 4,595,510 | 6/1986 | Winbladh et al. | 210/242.3 |
| 4,610,788 | 9/1989 | Ward | 210/923 |
| 4,640,645 | 2/1987 | Simpson et al. | 210/923 |
| 4,795,567 | 1/1989 | Simpson et al. | 210/242.3 |
| 4,797,210 | 1/1989 | Lonardo . | |
| 4,818,399 | 4/1989 | Midkiff | 210/242.3 |

FOREIGN PATENT DOCUMENTS

| | | | |
|---|---|---|---|
| 2488928 | 8/1980 | France . | |
| 0002073 | 1/1977 | Japan | 210/242.3 |

Primary Examiner—Richard V. Fisher
Assistant Examiner—Christopher Upton
Attorney, Agent, or Firm—Mathews, Woodbridge & Collins

[57] ABSTRACT

The present invention relates to an apparatus and method for concentrating and separating materials, particularly immiscible fluids of different densities. It is useful for concentrating and separating oil spilled on water. The invention includes a concentrator which comprises a tank into which the materials are fed. The tank is placed in the mixture which is fed into the tank. The mixture forces the denser material at the bottom of the tank out of a bottom opening in the tank. This results in a greater concentration of the lower density material remaining in the tank. The present invention includes a skimmer which can be used in combination with the concentrator. This invention can be useful to collect oil spilled on water.

12 Claims, 6 Drawing Sheets

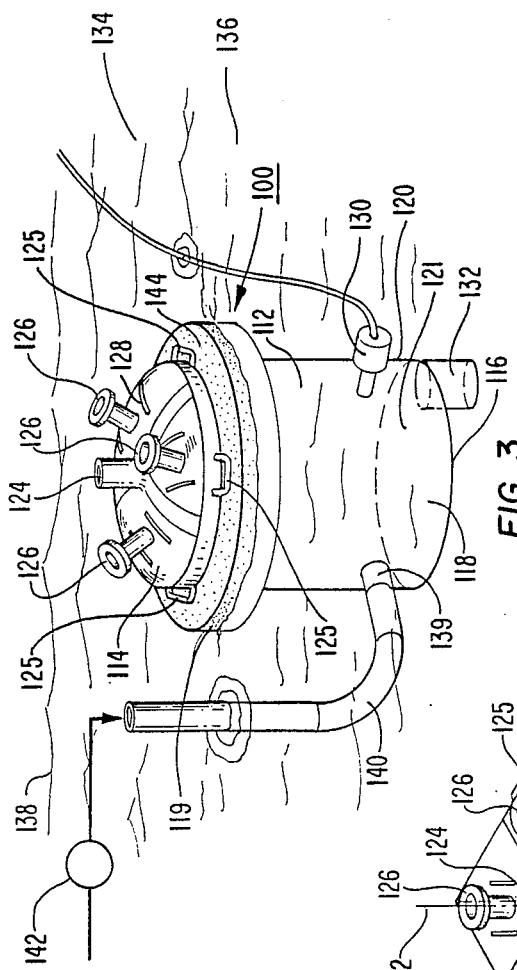
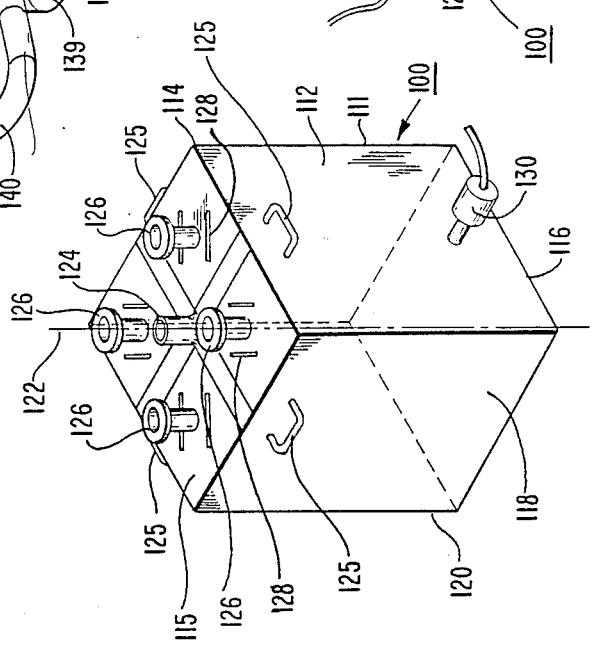
FIG. 3
FIG. 4
FIG. 4A
FIG. 4B

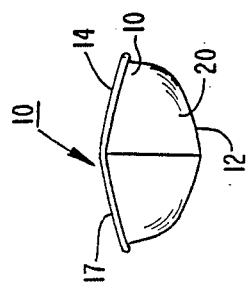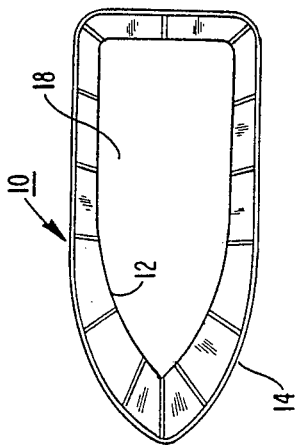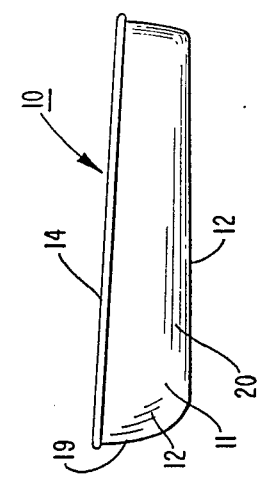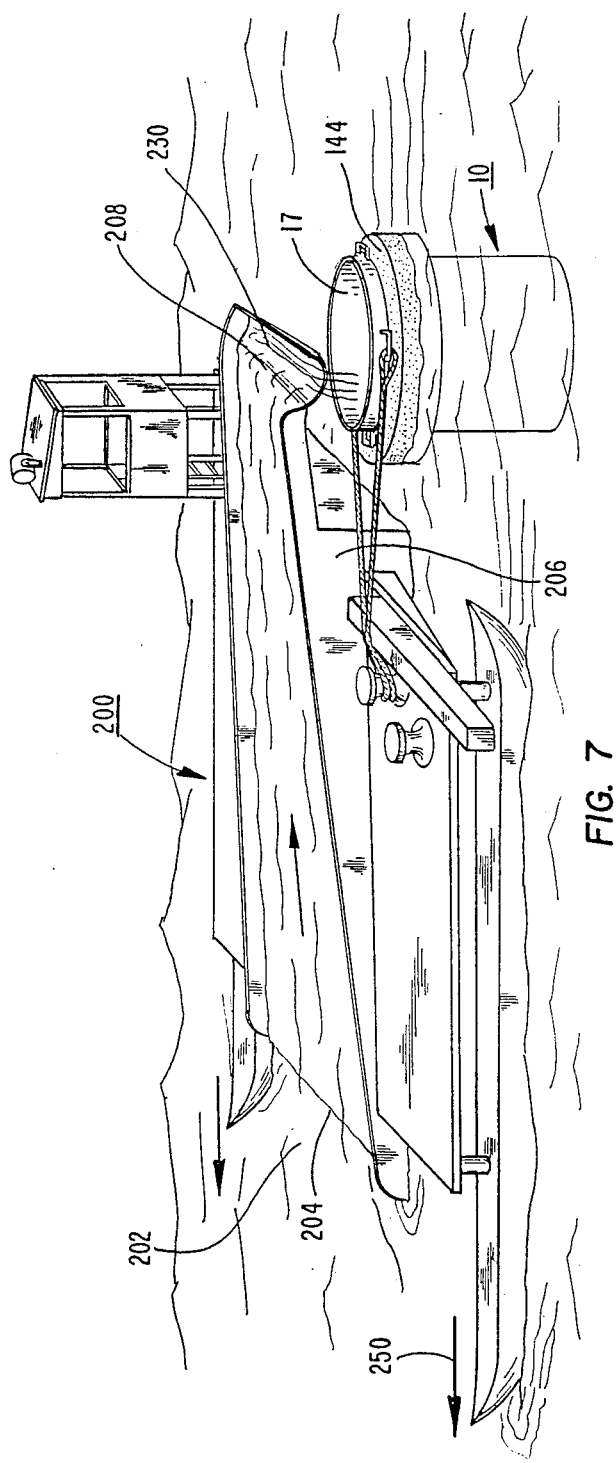

APPARATUS AND METHOD FOR CONCENTRATING MATERIALS

The present invention is an apparatus and method for concentrating and separating materials, more particularly for separating immiscible fluids; and most particularly for separating oil spilled onto water.

BACKGROUND OF THE INVENTION

There is no efficient way to contain or clean-up major oil spills into ocean, seas, lakes and rivers. Current technology involves containment booms which seem to be very ineffective, chemicals which decompose the oil and leave a residue on the ocean floor, and oil skimmers, which collect oil from the surface of the water along with a substantial amount of water. These skimmers collect and separate the oil or contaminant from the water and store the oil while returning the water to the ocean.

The oil spill in Prince William Sound in Alaska, U.S.A. is an example of a major ecological problem for the nation, requiring a costly clean effort. In this spill it took weeks to mobilize a clean-up effort, which at best, was marginal. The oil spill spread to an oil slick covering over 1000 square miles. Surrounding shoreline was polluted and many animals were killed. Existing methods were shown to be incapable of handling such a major oil spill.

The present invention is an improved solution to clean up current oil spills. In addition, this process, with variations, can be even more beneficial if used to contain oil spills within minutes of the accident. The current projected time frame for cleanup can be substantially diminished.

SUMMARY OF THE INVENTION

The present invention relates to a concentrator to concentrate a mixture of at least two materials of different densities and different phases, with at least one of the materials being a liquid. The concentrator is particularly useful to separate a mixture of at least two immiscible liquids, such as oil and water.

The concentrator comprises a tank having at least one sidewall extending laterally to form a continuous lateral enclosure, having an upper edge and a lower edge. The sidewall extends longitudinally from the upper edge to the lower edge.

The concentrator has a total density lower than the mixture. Upon placement of the concentrator in the mixture an upper portion comprising the upper edge and part of the sidewall adjacent to the upper edge float above the mixture, and a lower portion comprising the lower edge and a part of the sidewall adjacent to the lower edge extends below the level of the mixture. There is a top opening in the upper portion and a bottom opening in the lower portion of the tank. Preferably, the top and the bottom openings have a means by which they can be opened and closed. Preferably, there is a remote means to open and close the openings.

The present invention includes a method to concentrate a material from a mixture of at least two materials, preferably at least two liquids, and most preferably, oil and water. The method is useful to concentrate oil from a mixture of oil and water from an oil spill into a body of water such as oceans, lakes or rivers.

The method comprises placing the above described concentrator in the mixture of a first higher density material and second lower density material, i.e., water and oil. The mixture is fed into the concentrator, preferably through the top opening. A corresponding amount of the higher density material of the mixture at the bottom of the tank is forced out of the bottom opening. Preferably, oil and water are fed into the the tank and water is forced out of the bottom opening by the weight of the mixture fed into the tank. This results in a greater concentration of oil in the tank than in the mixture of oil and water near or surrounding the tank. The first material and second material, i.e., water and oil, can separate into layers in the tank. The material having a greater density, i.e., water, forms as a lower layer and the lower density material, i.e., oil, floats as an upper layer on the water. As the mixture of oil and water is fed into the tank the denser water is forced out of the bottom opening increasing the relative amount of the lower density material in the tank.

In alternate embodiments the fluids can be assisted into and out of the tank by suitable pump means. Where separation can be affected by viscosity differences (i.e., very viscous oil on water), the mixture can be fed into the lower position of the tank and the lighter, more viscous material, (i.e., oil) can float up through the denser less viscous material, (i.e., water).

The present invention also includes a skimmer which is particularly useful in combination with the concentrator. The skimmer is useful to collect a mixture of at least two materials wherein at least one material is a liquid, having different densities wherein the lighter density material, (i.e., oil), floats in an upper layer above the denser material (i.e., water). The skimmer comprises a flat surface having a leading edge and at least one outlet. There is a means to buoy the skimmer in the mixture of oil and water wherein the flat surface is at an acute angle to the surface of the mixture. The level of the leading edge beneath the surface of the mixture. The level can be controlled. There is a means to propel the skimmer through the mixture with the leading edge below the level of the lower density layer of material. As the skimmer travels through the mixture, the lower density material travels over the leading edge of the skimmer. Typically, a certain amount of the higher density material will also be skimmed. A suitable means can be used to convey the skimmed mixture from the leading edge to said outlet. Preferably, the velocity of the skimmer through the mixture forces the skimmed mixture up the skimmer surface to the skimmer outlet. Other means, such as paddles or pumping means can be used to assist the mixture to the outlet.

Preferably, the skimmed mixture is fed from the skimmer outlet into the above described concentrator.

As the concentrators are filled with a desired amount of the lighter density material, they can be left for later collection. Preferably, the bottom and/or top openings can be closed when the tank is filled.

In more specific embodiments, there can be a sensor, such as a level detector, in the tank to detect the amount of oil. This can be used to help determine when the tank is sufficiently full.

BRIEF DESCRIPTION OF THE DRAWINGS

Following are figures useful to understand the present invention. The drawings are schematic and are not drawn to scale.

FIG. 3 is a schematic view of an alternative form of with a cylindrical tank having floatation means, and various features including means to feed a mixture to the lower portion.

FIGS. 4, 4A and 4B illustrate a concentrator with a rectangular tank, closed on top and open on the bottom, the top having holes for filling and emptying the tank and at least one air vent.

FIGS. 5, 5A and 5B illustrate a further alternative in the form of a boat-shaped tank opened on the top and the bottom.

FIG. 7 is a schematic view of a skimmer in combination with a concentrator.

Common elements in different drawings have the same reference characters.

DETAILED DESCRIPTION OF THE PREFERRED EMBODIMENTS

The present invention comprises an apparatus and related method to concentrate a material in a mixture of materials of different densities and in different phases where at least one material is a liquid. The invention is useful to concentrate and separate one fluid in a mixture of at least two immiscible fluids of different densities, such as oil and water.

For the purpose of the present invention the following terms are defined as used in Grant, Hackh's Chemical Dictionary, McGraw-Hill Book Company, Inc. (1944); and Rose, The Condensed Chemical Dictionary, Reinhold Publishing Co. (1961).

"Phase" is a solid or liquid homogeneous substance, that exists as a distinct and mechanically-separate portion in a heterogeneous system. Homogeneous parts of such a system are separated from one another by definite physical boundaries. For the purposes of this definition an emulsion of oil in water is considered to be a phase.

"Oil" is a liquid which is not miscible (immiscible) with water and is generally combustible and soluble in ether.

"Crude oil" is the liquid fraction of petroleum having a specific gravity of from 0.65 to 1.07, but more typically, from 0.78 to 0.97, and more typically, from 0.85 to 0.95. Crude oil is insoluble in water and soluble in alcohol, ether or chloroform. A typical composition comprises paraffins, $C_{2n}H_{2n+2}$ where n varies from about 4 to about 35; olefins, such as $C_{2p}H_{2p}$, where p is from 21 to 26; aromatics and sulphones. Crude oils include, but are not limited to, those from the North Slope of Alaska, the continental United States, the Middle East, and Venezuela.

The term "total density" refers to the total combined density of all of the elements of the concentrator.

The apparatus useful in the present invention comprises a concentrator useful to concentrate a material in a mixture of at least two materials of different densities and different phases. Preferably, the concentrator is useful to concentrate a material and separate at least two immiscible liquids. Most preferably, the concentrator is useful to concentrate the amount of oil in a mixture of oil and water, and separate oil from a mixture of oil and water. The oil is concentrated and can be separated from the water. The preferred embodiments of the present invention will be considered with reference to the accompanying drawings.

Figure 1B:
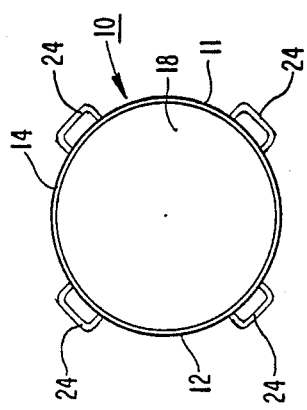
FIGS. 1, 1A, and 1B illustrate an embodiment of a concentrator with a cylindrical tank open on both ends.
Figure 1A:
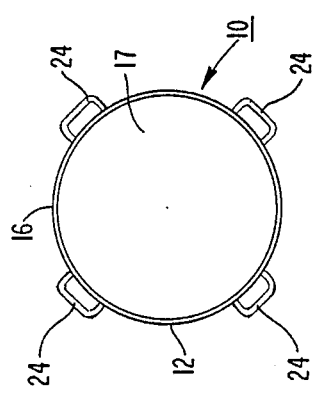
Figure 1:
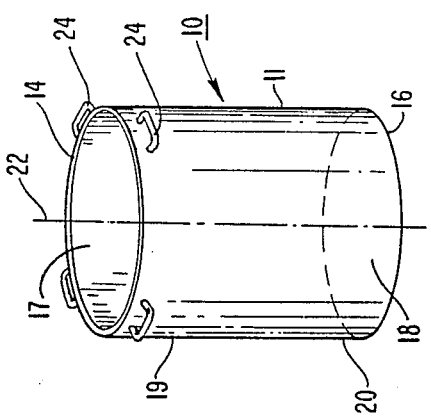

FIG. 1 illustrates one form of the concentrator of the present invention. Concentrator 10 comprises tank 11 having at least one sidewall 12. The sidewall 12 of the embodiment of FIGS. 1-1B extends laterally to form a continuous cylindrical lateral enclosure. The sidewall 12 has an upper edge 14 and a lower edge 16. There is a top opening 17 defined by upper edge 14 and a bottom opening 18 defined by bottom edge 16.

The concentrator 10 is made from a material having a total density lower than the density of the mixture (i.e., oil and water) into which the concentrator 10 is to be placed. While the tank 11 can be constructed of material which is more dense than the mixture, suitable floats can be associated with the tank to maintain the total density of the concentrator less than the density of the mixture. For example, floatation means, such as a floatation collar, can be attached to the tank or incorporated into the tank to enable the tank to float.

The concentrator 10 has an upper portion 19 adjacent to upper edge 14, and a lower portion 20 adjacent to the lower edge 16. Upon being placed in the mixture, the upper portion 19 is located above the surface level of the mixture and the lower portion 20 is below the level of the mixture. The concentrator 10 has a vertical axis 22 which is generally vertical when it is placed in the mixture. Preferably, the upper portion 19, which extends above the surface of the mixture to be separated, is up to 25 percent, and preferably, at least 1 percent, of the vertical length of the tank 10 along vertical axis 22. The lower portion 20 is at least the lower 75 percent along the vertical axis. The upper portion 19 is long enough to contain the higher level of the lower density material (i.e., oil) than the surrounding mixture.

The volume of the tank is as large as can practically be used. Useful tanks are from about 5 feet to about 60 feet long, preferably, 10 to 45 feet and more preferably, 15 to 30 feet long along the vertical axis 22. The sidewall 16 encloses an area of from about 20 feet to 10,000 square feet, preferably, 300 to 2000 square feet, and more preferably, 400 to 1000 square feet. The shape of the tank can vary. The useful shapes include cylindrical (FIG. 1), square, rectangular (FIG. 3), boat shaped (FIG. 4), other shapes not shown, such as spherical, oval, and triangular.

The upper edge 14 or lower edge 16 can be in a plane perpendicular to the vertical axis, or can be truncated at an angle, or have other suitable shapes relative to the vertical axis.

The tank 11 can be made of a suitable material which can withstand sea water, fresh water and oil without deteriorating. Because the tank 11 operates substantially below the fluid level, the need for structural support is not as great as a tank on land. This is because internal and exernal pressures acting on the lower portion of the tank are substantially equal. Useful materials include metals such as, steel, aluminum or the like, polymeric materials, such as water and salt resistant plastics, such as fiberglass filled resin, such as polyester, or composites of various materials. The concentrator can include or be associated with weights or buoying means as needed to assure that the top portion 19 is above the surface level of the mixture and the bottom portion is below the surface level of the mixture. The concentrator can have air compartments which can controllably be filled with air or fluid (i.e., water) to control the level of the tank in the mixture.

Tanks, such as those illustrated in FIG. 1, having different diameters can be stored concentrically within one another.

Figure 2B:
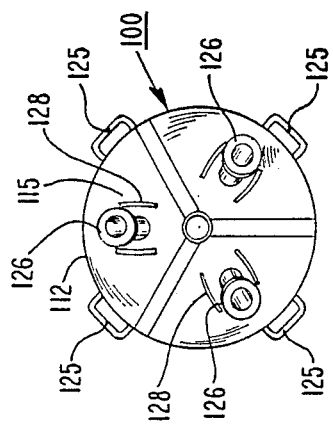
FIGS. 2-2C illustrate another embodiment comprising a concentrator which is closed on top and open on the bottom, the top having holes for filling and emptying the tank and at least one air vent.
Figure 2A:
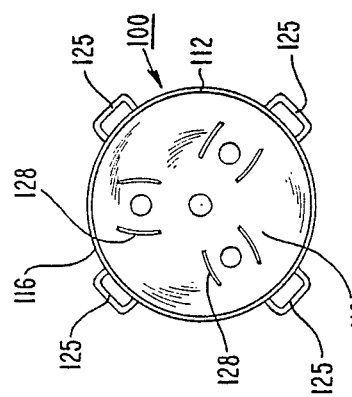
Figure 2:
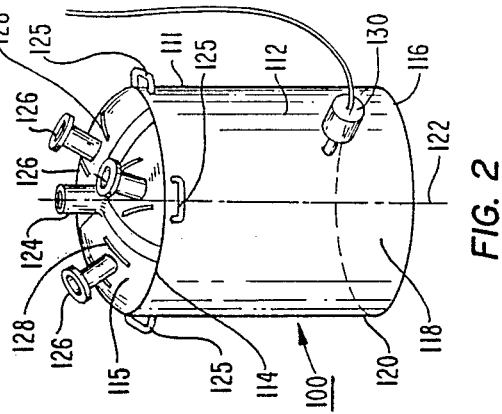

FIGS. 2-2B illustrate an alternate and preferred embodiment of the concentrator 100 having a cylindrical tank 111. Concentrator 100 has a sidewall 112, upper edge 114 and lower edge 116 similar to the cylindrical tank 10 described above with reference to FIGS. 1-1B. The upper edge 114, of the embodiment of FIGS. 2-2B, defines an area that is enclosed by top cover 115. The top cover 115 has at least one air vent 124. The top opening can be at least one top port 126 through which tank 111 can be filled or emptied. The top ports 126 can optionally have top port vents 128.

The bottom opening 118 is defined by the area enclosed by bottom edge 116. In this embodiment, the bottom of tank 111 is open.

The concentrator of the present invention can have a suitable sensing means to sense the relative amounts material, and preferably, the level of the lower density material. For example, as the level of oil in the tank increases, the sensing means 130 can detect the oil level and signal the level to an operator. A useful sensing means is a floatation device which floats at the interface of the lower and higher density materials.

The tank can have means to open or close the top opening, such as top port 126. When the sensing means 130 indicates that the tank has the predetermined or desired level of the less dense material (i.e., oil) the top ports 126 can be closed. In a preferred embodiment the sensing device can signal remote means to close the top opening.

An alternate embodiment is shown FIG. 3, with common elements having common reference characters as FIG. 2. The bottom opening 118 is closed with a suitable closing means, such as bottom cover 121. There is at least one bottom opening such as bottom port 132. In a manner analagous to closing the top opening, the bottom opening, i.e., bottom ports 132, can be closed when the level of lower density material reaches a predetermined or desired level.

FIG. 3 illustrates a concentrator 100 with a cylindrical tank 111 particularly useful to clean an "oil spill" on a body of water. Oil 134 has been spilled on water 136. The oil is less dense than water and floats on the water. The oil generally floats in a layer or slick 134. Additionally, the water immediately beneath the layer of oil may be contaminated. The upper portion 119 of the tank 111 is above the level of the surface 138 of the "mixture" of oil and water. The lower portion 120 of tank 111 is below the surface 138. The upper portion has sufficient vertical height above the surface 138 to enclose oil which is contained within the tank and is at a height above the surface 138 of the oil and water. The height of the upper portion 119 above surface 138 can be varied by varying the density of the concentrator 100. The total density of the concentrator can be controlled by controlling the means to buoy it. For example, the amount and location of the floatation means attached to the tank can be used to control its total density, and the height of the upper portion above surface 138. The desired height will depend on factors including the density of the oil. For example, a tank completely full of oil having a specific gravity of 0.9, will contain oil at a level of about 11 percent of the vertical height above the surface 138. Additional floating means, such as outriggers, as well as weights and anchors, can be used to stabilize the tank in the water.

The embodiment of FIG. 3 also contains an optional means to feed the mixture to an inlet 139 in the lower portion 120. This includes a conduit 140 and feed means 142, such as a pump. This is useful where the lower density material has a much greater viscosity than the higher density material. For example, feeding a mixture of viscous oil and water to the bottom would enable the oil to more easily float through the less viscous water and permit faster separation into oil and water layers in the tank 111. Means to heat the mixture can optionally be provided to enable the oil to have decreased viscosity.

The concentrator of the present invention can include suitable floatation means, such as collar 144. The amount and location of the floatation means can be increased to raise or lower the tank in the mixture. Alternatively, the concentrator 100 can be provided with air chambers that can be filled with air or water to control the total density.

FIGS. 4-4B is a concentrator of the present invention similar to that of FIG. 2, except that it is in the shape of a rectangular solid. This permits efficient storage of a maximum volume of empty tanks.

FIGS. 5-5B show one form of a concentrator of the present invention, similar to that of FIG. 1, except that it is in the shape of a boat for streamline movement through a fluid (water).

The present invention includes a method for separating a mixture of at least two materials of different densities and different phases where at least a first material is a liquid and at least one second material is at a lower density than the liquid and floats to or near the top of the first material. The method is particularly useful to separate and concentrate oil which has been spilled on water.

The method comprises placing a concentrator, as described above, in the mixture. The mixture is fed into the tank, preferably through the top opening. Alternatively, the mixture can be fed into the bottom opening, or into a suitable inlet into the tank. A corresponding amount of the first material (i.e., water) is thereby forced out of the bottom outlet, preferably the bottom opening of the tank. The mixture in the tank will thereby form a more concentrated amount of the lower density material in the tank. The less dense material is preferably permitted to separate into a layer which floats on the first material.

The second material (oil) can be removed from the separated layer intermittently or continuously.

The level of the second material can be sensed and the top and/or bottom openings closed when the level of second material reaches a predetermined or desired level.

The present invention is particularly useful for the simultaneous collecting of oil and water from the surface of a body of water and feeding it into the tank of the present invention for concentration and separation. The oil and water mixture in the tank will be in a generally calm environment other than the agitation resulting from the oil and water entering the tank which operates as described.

The concentrators having open tanks where openings can be closed are useful so that when filled with oil they can freely float in the surrounding water. It is preferred that the concentrator have a top opening and/or bottom opening capable of being closed. Most preferably, the top opening is capable of being closed. A major advantage of being able to close the top and bottom openings is that the concentrator will float with only a limited portion of the tank above water level. In rough seas, the tipping action along the vertical axis will be greatly limited due to the length of the walls of the tank, which are submerged. There can be stabilizing means such as floats, i.e., outriggers and/or weights, i.e., anchors.

The method of the present invention includes cleaning an oil spill from a body of water of the type where the oil is located at or near the surface of the body of water.

The method comprises placing a concentrator, as described above, in the oil and water. Oil and water from the surface of the body of water ar fed into the tank. Water at the bottom of the tank is removed either by being forced out by the incoming oil and water, or being removed by means such as a pump means. The oil and water collected have a higher concentration of oil than the surrounding spill area. The oil and water within the tank can form separate layers in the tank due to their density difference.

The oil can be intermittently or continuously removed from the tank into a suitable storage vessel, such as a tanker ship. Alternatively, when there is a predetermined or desired amount of oil in the tank, the top and/or bottom opening can be closed and the tank can be left floating until it can be drained.

The present invention further includes a skimmer apparatus which can be used in combination with the concentrator. The skimmer apparatus is used to collect the oil and water at or near the surface of the oil spill.

Figure 6:
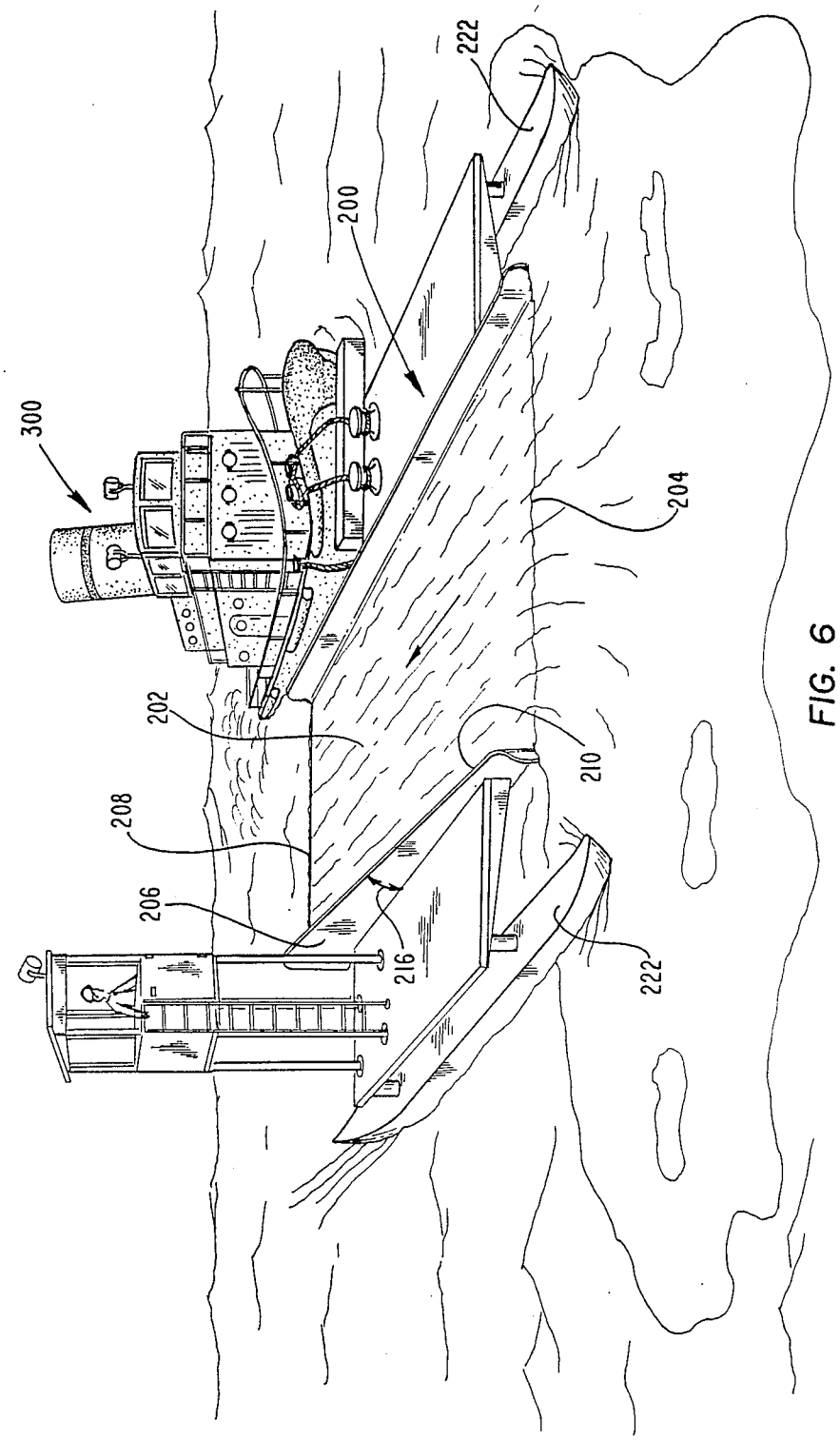
FIG. 6 is a schematic view of a skimmer.
Figure 8:
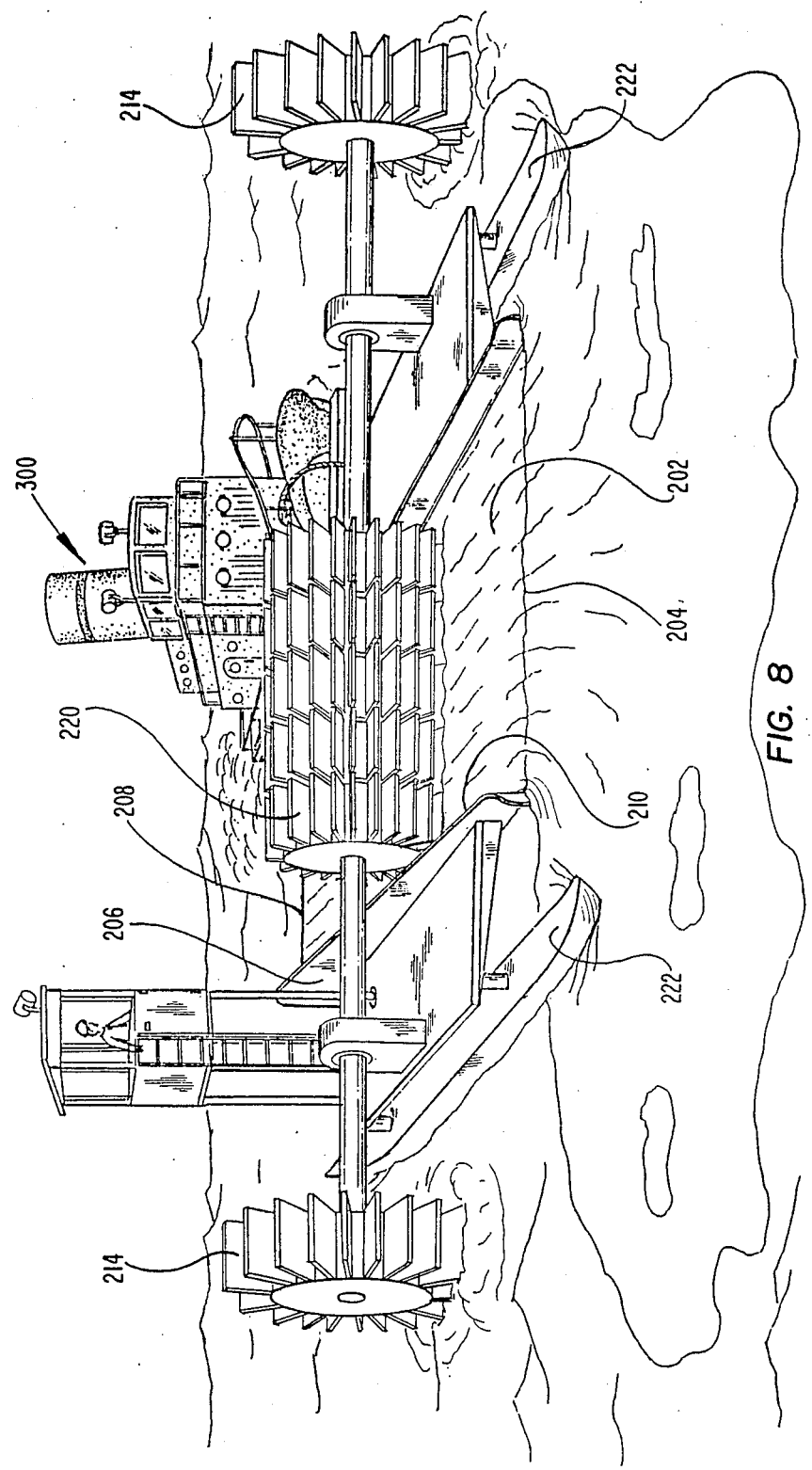
FIG. 8 is a schematic view of a skimmer with a means to force oil from the leading edge of the outlet.

Useful and preferred skimmers and a skimmer in combination with the tank of the present invention are illustrated in FIGS. 6–8.

The skimmer 200 of FIGS. 6 and 7 has a flat surface 202 having a leading edge 204. The skimmer has a buoy means such as float 206, or pontoons on which a substrate having a flat surface 202 is supported. The flat surface is supported to generally "face up", inclining in a direction away from the surface of the oil and water. There is an outlet, such as trailing or rear edge 208. The rear edge 208 can be narrower than the leading edge 204. Baffles or troughs in the surface 202 can direct oil and water flowing from the leading edge 204 to suitable outlets which direct the skimmed oil and water to concentrators of the present invention. As shown in FIG. 7, there can be a trough 230 connected to rear edge 208. The mixture of oil and water flows past the rear edge 208 into trough 230. The trough can be at an angle to the horizontal whereby the mixture of oil and water flows past the rear edge 208 into trough 230. Sidewalls 210 contain oil and water on surface 202. The sidewalls can vary in height and are preferably from 6 inches to 3 feet high, above the surface 202.

There is a means to propel the skimmer through the water. The skimmer can be pushed through the water by auxiliary vessels such as tugboats. Alternately, the skimmer can be pulled through the water. It is desirable that the means to propel the skimmer do not disturb the oil layer at the surface 212 in front of leading edge 204.

Alternately, the skimmer can have its own propulsion means, such as propellers or paddles 214 shown in FIG. 8. These paddles are preferably located to the rear of leading edge 204, i.e., between leading edge 204 and rear edge 208.

The leading edge can be controlled to be beneath the surface 212 of the oil and water. The level of the leading edge can be adjusted depending on the amount and thickness of the oil layer on the water. Preferably, the depth the leading edge 204 penetrates into the oil and water and the angle 216 between surface 202 and the surface 212 are controlled by amount and location of floats 206.

The length of the skimmer and angle 216 between the skimmer surface 202 and the oil and water surface 212 can be varied. The angle between the skimmer surface 202 and the oil/water surface 212 is an acute angle. The angle 216 is preferably from 1 degree to 45 degrees, more preferably, from 5 degrees to 30 degrees, and most preferably, from 5 degrees to 20 degrees. The distance between the leading edge 204 and rear edge 208 can also be varied. The distance from leading edge 204 to rear edge 208 can vary as desired. A useful distance is from 5 feet to about 30 feet. The angle 216 and length will depend on the velocity the skimmer will travel through the water and the thickness of the oil. The oil and water will be forced up the ramp-like surface 202 by the movement of the skimmer through the oil and water.

The skimmer, as shown in FIG. 8 can further comprise a means to force the oil and water mixture to the outlet such as rear edge 208. A useful means to force the mixture toward rear edge 208 is a mixture paddle wheel 220. This can be on the same axle or paddle wheel 214. The motor means (not shown) to propel the skimmer 200 also assists the mixture to the skimmer outlet, i.e., rear edge 208. The skimmer 200 can have outrigger pontoons 222 to help provide stabilization. The distance from the leading edge 204 to rear edge 208 will depend on the means to force the mixture to the outlet.

The surface 202 of the skimmer can be made of a material which can withstand water and oil. The surface and its support can be made of a structurally suitable metal, composite, polymeric material or wood. Where necessary, the structural material can be coated with suitable coating materials such as fluoropolymer based paints or other marine type coatings.

FIG. 7 illustrates the skimmer 200 as shown in FIG. 6 used in combination with the concentrator of FIG. 1. The concentrator has a floatation collar 144 as shown in FIG. 3. The concentrator 10 is preferably removably connected to skimmer 200 to position the top opening 12 of the tank beneath the rear edge 208 and trough 230 of the skimmer.

As the skimmer is propelled through the oil and water, in a direction 250 from rear edge 204 to rear edge 208, a mixture of oil and water are skimmed by leading edge 204 and travel along surface 202 to outlet, i.e., rear edge 204, and drop into trough 230 and then into top opening 17 of tank 11.

When the tank 11 has a desired amount of oil collected, it can be released and replaced with a new concentrator 10 so as to continuously skim and concentrate the oil in tanks. The concentrated oil in the tanks can then be collected. The concentrators can be collected and the oil and water within the tank be permitted to separated based on their density. Alternatively, the oil and water can be stored in the concentrator for later processing, particularly where there are means to close openings to the concentrator. Finally, the oil, and optionally the water, in the tanks can be removed to tanker ships or to shore.

Several examples ar set forth below to illustrate the nature of the invention and the manner of carrying it out. However, the nature of the invention should not be considered as being limited to the details thereof.

EXAMPLES

These examples were conducted in a tub. The tub was filled with tap water. The water area surface was about 350 square inches.

Example 1

A ball of heavy grease (multi-lube lithium EP) was placed in the water-filled tub. The ball was then pushed under a clear plastic cover, which was circular in shape and about twelve inches in diameter by four inches in height. The bottom of the device was open; there was no opening on the top. The ball of grease immediately rose within the concave area, displacing an equal amount of water.

This test demonstrates that crude oil, which is lighter than grease but heavier than motor oil, will also rise to the top of the proposed tanks.

Example 2

A fabric softener dispenser made of white plastic having a bottom opening was placed in the water with the concave side down. This dispenser had the appearance of the top one third of a sphere, and was about ten inches in diameter. A piece of hose with a funnel on it was directed under the dispenser and held directly under the dispenser while pouring 10W40 weight oil through the funnel into the hose. The oil drained from the hose and entered under the dispenser into the concave area without any visible signs of oil in the surrounding water until such time as the area under the dispenser was filled. It was determined by measurement that the oil within the concave area occupied 20 square inches X depth of only 1½ inches, or 30 cubic inches. The oil was then released by tipping the device over slowly; the resulting oil slick covered about ⅓ to ½ of the water's surface in the tub. It was estimated that the slick covered about 120 to 180 square inches or an average of 7½ times the area previously contained. The water was then agitated and it was observed that the oil slick now covered almost 100 percent of the 350 square inch surface.

The above test indicates, without question, that oil forced only by gravity pressure under a container submerged in water will cause the oil to rise to the top and force water out the bottom until such time as the container is filled with oil.

Example 3

An attempt was then made to collect the dispersed oil and put it in a container. A 9 inch diameter hole was cut out of the center of the clear plastic cover used in Example 1. The clear plastic cover was supported with styrofoam around the edges to keep the top of it approximately 1 inch above the water level. The water was skimmed with a dust pan and the collected mixture dumped into the center of the plastic device. As this was done, the oil slick within the container became darker and the oil slick outside the container became lighter.

Example 4

Unadulterated motor oil was poured into the center of the device used in Example 3 and the oil remained within the walls. Further, a mixture of about 20 percent oil and 80 percent water was agitated vigorously within the oil can. The resulting brownish mixture was poured into the center of the same device. It was again noted that the oil rose to the top and the slick within the device became darker. This test proves the feasibility of storing skimmed unprocessed oil in a container and allowing the natural separation process to occur.

Hypothetical Example 5

Figure 9:
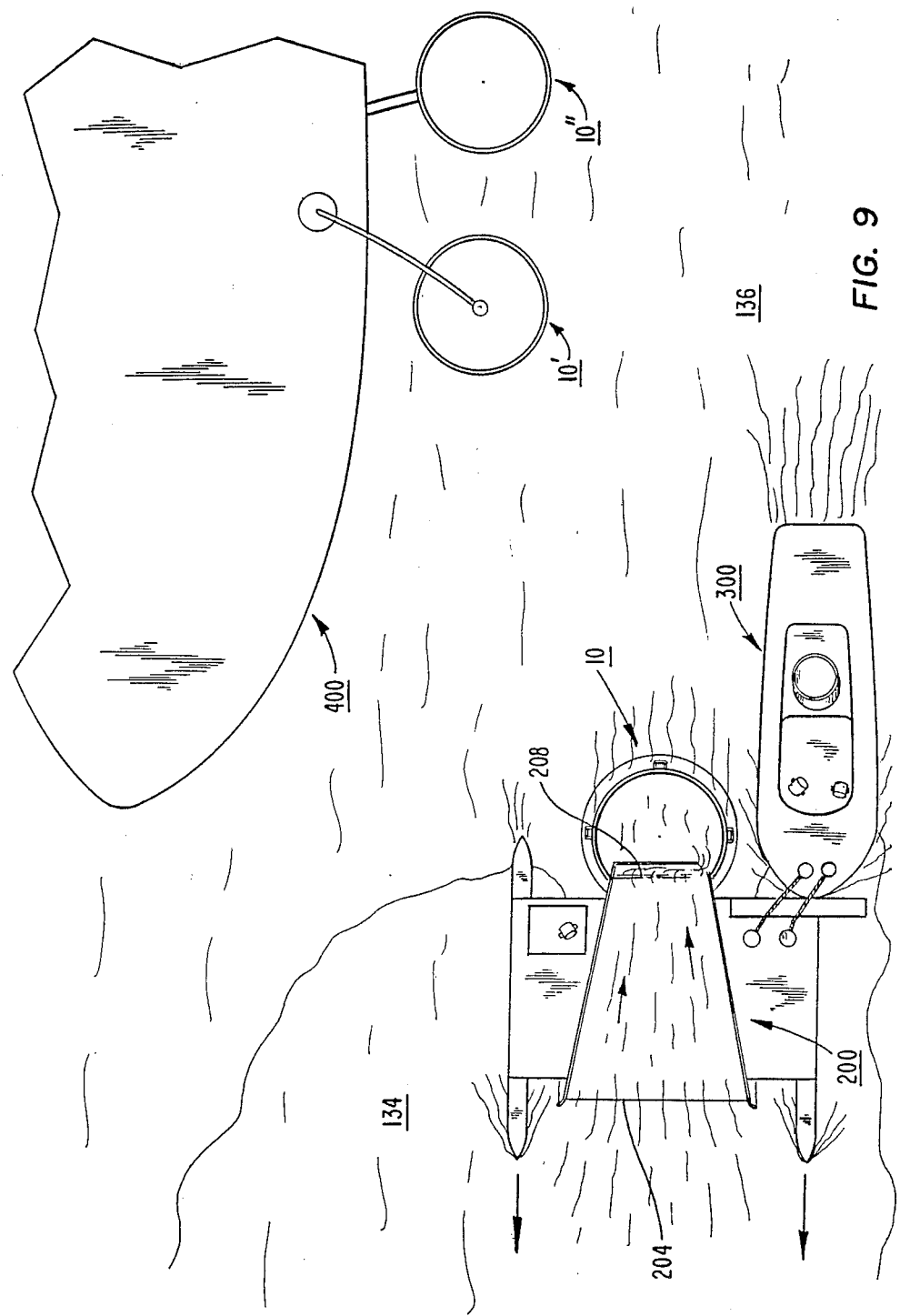
FIG. 9 illustrates the operation of the present invention.

This is a hypothetical example of an oil spill at sea, only presented for illustrative purposes. It is assumed that there is no effect of wind, or current. FIG. 9 illustrates this example. The spill is crude oil covering one square mile. The oil layer is about one inch thick, which equals about 2,323,200 cubic feet of oil. The oil has a specific gravity of about 0.90. An oil skimmer 200 and tank 10 as shown in FIGS. 6, 7, and 9 are used to clean the oil.

The skimmer 200 and concentrator 10 are removably connected for use in combination. They are pushed by tugboats 300 at about 5 miles per hour. The skimmer has a leading edge 204 which is 30 feet wide and a rear edge 208 which is 25 feet wide. The angle between the skimmer surface 202 and the oil/water surface 212 is about 15 degrees. The length of the skimmer from the leading edge to the rear edge is about 20 feet. The height of the rear edge above the surface is about 5 feet. If necessary, there is a means to force oil and water on the surface 202 toward the rear edge 208, such as jets of water.

There is a concentrator 10 having a tank 11, about 30 feet in diameter and 40 feet from top to bottom and a volume of 28,260 cubic feet. The concentrator 10 trails the skimmer with the top opening 12 beneath the rear edge 204. The tank has a floatation device 144 so that the upper portion 18 is about 4 feet above the surface 202, and the lower portion is about 36 feet below the surface 202.

The skimmer is set to skim about one foot of oil and water. The skimmer feeds the tanks about 792,000 cubic feet of fluid per hour, of which about 66,000 cubic feet per hour are oil (for a skimmer moving at 5 miles per hour). Without considering time to change tanks, it takes the skimmer of the present invention about 35 hours of skimming to fill about 82 collectors ½ full of oil, cleaning substantially all of the spilled oil. As tanks are filled they can be collected, or the oil is then pumped into tanker vessels, such as tanker vessel 400, and the collectors are reused.

In FIG. 9, concentrator 10 is being filled, concentrator 10' is being emptied into tanker vessel 400, and concentrator 10'' is empty. Concentrator 10'' is removably attached to vessel 400, and can replace concentrator 10 when it collects a desired amount of oil.

Modifications, changes, and improvements to the preferred forms of the invention herein disclosed, described and illustrated may occur to those skilled in the art who come to understand the principles and precepts thereof. Accordingly, the scope of the patent to be issued hereon should not be limited to the particular embodiments of the inventions set forth herein, but rather should be limited by the scope of the claims based on the advance of which the invention has promoted the art.

What I claim is:

1. A method of cleaning up an oil spill which forms a layer overlaying the surface of a body of water, which method comprises the steps of:
    moving a skimming means in a preselected direction along the surface of the body of water to collect a mixture of said layer and water from said surface, the skimming means comprising:

a flat surface having a leading edge;

an outlet from the flat surface;

means to buoy the skimmer in a mixture of said layer and water wherein the flat surface is at an acute angle to the surface of the mixture;

means to control the level of the leading edge beneath the surface of the mixture; and means to propel the skimmer through the mixture;

juxtaposing to said skimming means at least one tank in a floating relation to said surface of the mixture with an upper edge protruding from said surface, said tank comprising a top opening, a laterally-extending sidewall having a lower edge which substantially defines a bottom opening, a compartment which extends down into said body of water to an internal depth and substantially exceeds the depth of said layer, the top opening being positioned to receive the mixture from the skimmer outlet; and continuously directing a flow of said mixture from said skimmer into said tank in said internal depth direction during a process in which said compartment fills with an oil concentrate formed from said mixture, with a corresponding amount of water being expelled from said tank through said bottom opening during said process.

2. The method in accordance with claim 1 further comprising the steps of:

providing a containing vessel adjacent said tank which has a capacity which substantially exceeds the capacity of said tank; and directing a flow of said oil concentrate from said tank to said large containing vessel for storage and/or transport.

3. The method in accordance with claim 2 which comprises providing a first pressure differential between said surface and the internal depth of said compartment for inducing the flow of said mixture in a depth direction in said tank;

sensing when said tank is substantially filled to its internal depth with an oil concentrate formed from said mixture; and providing a second pressure differential in a direction different from said first pressure differential, for inducing flow of said oil concentrate from said tank to said large containing vessel.

4. A system for cleaning an oil spill which forms a layer overlaying the surface of a body of water, said system comprising:

skimming means constructed and arranged to move in a preselected direction along the surface of the body of water for collecting a mixture of oil and water from said surface, the skimming means comprising:

a flat surface having a leading edge;

an outlet from the flat surface;

means to buoy the skimmer in a mixture of said layer and water wherein the flat surface is at an acute angle to the surface of the mixture;

means to control the level of the leading edge beneath the surface of the mixture; and means to propel the skimmer through the mixture;

at least one tank disposed in a juxtaposed floating relation to said skimming means, the tank being constructed and arranged to comprise an upper edge protruding from said surface of the mixture, a top opening, a laterally-extending sidewall having a lower edge which substantially defines a bottom opening, a compartment with an internal depth which extends down into said body of water and substantially exceeds the depth of said layer, the top opening being positioned to receive the mixture from the skimming means outlet; and means for continuously directing flow of said mixture from said skimmer into said tank in an internal depth direction causing water to be expelled through said bottom opening as said tank fills with an oil concentrate formed from said mixture.

5. The system of claim 4 further comprising a means to force the mixture from the leading edge to the outlet.

6. The system of claim 5 wherein the means to force the mixture comprises a paddle wheel above the flat surface of the skimmer, the paddles having ends which intersect the mixture on the flat surface and force the mixture to the outlets.

7. The system of claim 4 wherein the outlet is a trailing edge.

8. The system of claim 4 further comprising a trough at the outlet disposed to receive the mixture from the outlet, the trough having a trough outlet.

9. The system of claim 4 herein the flat surface is at an acute angle of from 1 degree to 45 degrees to the surface of the mixture.

10. The system in accordance with claim 4 further comprising:

a containing vessel having a capacity which exceeds the capacity of said tank; and a means to direct the oil concentrate to flow from the tank into the containing vessel.

11. The system in accordance with claim 10 which comprises sensing means for monitoring the density of said oil concentrate in said tank, and wherein the means for directing flow of said oil concentrate from said tank into said large containing vessel is responsive to a signal from said sensing means, and can direct flow from one or more levels.

12. The combination in accordance with claim 11 in which said means for directing flow of said oil concentrate from said tank into said large containing vessel comprises one or more pumping means.

* * * * *